United States Patent [19]

Martin et al.

[11] Patent Number: 4,851,684
[45] Date of Patent: Jul. 25, 1989

[54] MODULAR PHOTON DETECTOR CRYOSTAT ASSEMBLY AND SYSTEM

[75] Inventors: Gregory N. Martin; Michael R. Burke, both of Knoxville, Tenn.

[73] Assignee: Ortec Incorporated, Oak Ridge, Tenn.

[21] Appl. No.: 28,636

[22] Filed: Mar. 20, 1987

[30] Foreign Application Priority Data

Mar. 25, 1986 [GB] United Kingdom ............... 8607356

[51] Int. Cl.4 ............................................. G01J 5/16
[52] U.S. Cl. ...................................... 250/352; 62/51.1
[58] Field of Search .............. 250/352; 62/299, 514 R

[56] References Cited

U.S. PATENT DOCUMENTS

| 3,609,992 | 10/1971 | Cacheux | 62/514 |
|---|---|---|---|
| 3,611,746 | 10/1971 | Marsing et al. | 62/514 |
| 3,807,188 | 4/1974 | Lagodmos | 62/514 R |
| 3,851,173 | 11/1974 | Taylor et al. | 250/332 |
| 3,894,403 | 7/1975 | Longsworth | 62/514 R |
| 4,218,892 | 4/1980 | Frosch | 62/514 |
| 4,324,104 | 4/1982 | Horn et al. | 62/77 |
| 4,658,601 | 4/1987 | Burchell et al. | 62/514 R |

OTHER PUBLICATIONS

International Search Report PCT/US87/00645, Jul. 7, 1987.

Primary Examiner—Janice A. Howell
Assistant Examiner—Constantine Hannaher
Attorney, Agent, or Firm—Robert P. Cogan

[57] ABSTRACT

In a photon detector system, such as a cryogenic gamma radiation detector cooled by a dewar, a vacuum-jacketed radiation detector is provided in a cryostat assembly. The detector can be used with any one of a plurality of cryostats without breaking the vacuum seal therearound when transferring from one cryostat or dewar to another. The detector is vacuum-jacketed and mechanically and thermally connected to an axially projecting conducting member, which member is received in a thermally conducting transition member contained in the cryostat. The transition member is thermally and mechanically coupled to the dewar and may include a fluid path completing a vacuum jacket in the dewar.

21 Claims, 6 Drawing Sheets

MODULAR PHOTON DETECTOR CRYOSTAT ASSEMBLY AND SYSTEM

BACKGROUND OF THE INVENTION

This invention relates to cryogenically cooled radiation detectors and more specifically to means in a cryostat for thermally and mechanically connecting a detector to a dewar.

Photon detectors or spectrometers are useful in measuring low levels of radionuclides. Examples of such measurements include monitoring of the environment and effluent discharge of nuclear power stations, measurement of food product for human intake and evaluation of the natural environment. Because of the radionuclide content of some samples, it has become standard practice to use the resolving power of germanium semiconductor detectors to identify and quantify the isotopes present. Germanium semiconductor gamma-ray spectrometers have been developed to provide optimum performance for such measurement. When x- or gamma rays impinge on a germanium detector, there is a finite probability of an interaction occurring which results in the creation of electron-hole pairs. If the impinging beam has an intensity, I, at a given energy, E, then it is absorbed in the detector according to an exponential law:

$$I(X) = I_0^{(-X/\lambda)},$$

where $I_0$ is the beam intesity at the surface of the detector and X is the distance from the surface, and $1/\lambda$ is the absorption coefficient and can be considered as the sum of three components due respectively to the photoelectric, Compton and pair-production processes. When an interaction occurs and electron-hole pairs are created, the electric field due to the bias voltage sweeps out the charge carriers resulting in an induced current pulse which is integrated at the input of a charge-sensitive preamplifier. Both charge carriers, the electrons and the holes, contribute to the current pulse. In order to provide for this operation, the germanium detector must be vacuum-jacketed and cryogenically cooled. Normally, such detectors are cooled to below 100° K. A nominal operating temperature is 77° K.

The germanium detector is incorporated in a cryostat. The cryostat comprises an evacuated housing surrounding the detector, the detector itself, a cryogenically cooled field effect transitor preamplifier in the housing, electronics circuit boards exterior to the housing mounted on support means coaxial with and extending from the detector, and means for communicating the detector with a cryogenic cooling source such as liquid nitrogen. Cryostats are provided in various sizes and configurations for various applications. Similarly, different dewars are utilized for varying applications. One form of cryostat may be connected to a dewar having a handle projecting therefrom which is balanced for maintaining the cryostat in a hand-held horizontal disposition. Different dewars may be provided to provide for eight hour or twenty-four hour holding time. Other dewars may be provided which have cryostats protecting from a top portion, a bottom portion or a side thereof. For different applications, nominal dewars may come in sizes of 0.4, 1.2, 7.5, 15, 25 or 30 liters. Different specific applications require different combinations of dewar and cryostat. The conventional means for connecting cooling devices to the detector has resulted in construction of a closure in which vacuum-jacket surrounding the detector is the same vacuum jacket that must surround the portion of the cryostat extending from the detector into the dewar and in some cases the dewar vacuum jacket. This widely successfully used and conventional design does not permit modularity of assembly between detector heads and different cryostats or different dewars. The experience in the art is that in reworking of detectors to move them from one cryostat assembly to another, yield rate is low. Consequently, an expensive inventory of cryostats must be maintained for a number of applications.

SUMMARY OF THE INVENTION

It is therefore an object of the present invention to provide a cryogenically cooled photon detector system comprising a dewar and a cryostat which is modular in construction.

It is also an object of the present invention to provide a detector which may be included in a modular cryostat assembly.

It is a more specific object of the present invention to provide a detector head for inclusion in a system of the type described with its own vacuum jacket.

It is a further specific object of the present invention to provide a detector head of the type described including a thermally isolated and vacuum jacketed conduction means for providing thermal communication between the detector and a cooling source.

Briefly stated, there are provided in accordance with the present invention, a spectrometer including a cryostat and a modular germanium photon detector head assembly for inclusion therein. A detector is included in a vacuum-jacketed head and thermally and mechanically connected to a conducting member projecting from the vacuum chamber to the outside of the detector head assembly. The conducting member projects into a cryostat transition member which may mate with a dewar to define a sealed, evacuable chamber in fluid communication with a vacuum-jacket surrounding the dewar. A thermally conductive receptacle in the fransition member extending from the dewar engages the conducting rod to complete the system.

BRIEF DESCRIPTION OF THE DRAWINGS

The means by which the foregoing objects and features of invention are achieved are pointed out in the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENTS

Figure 1:
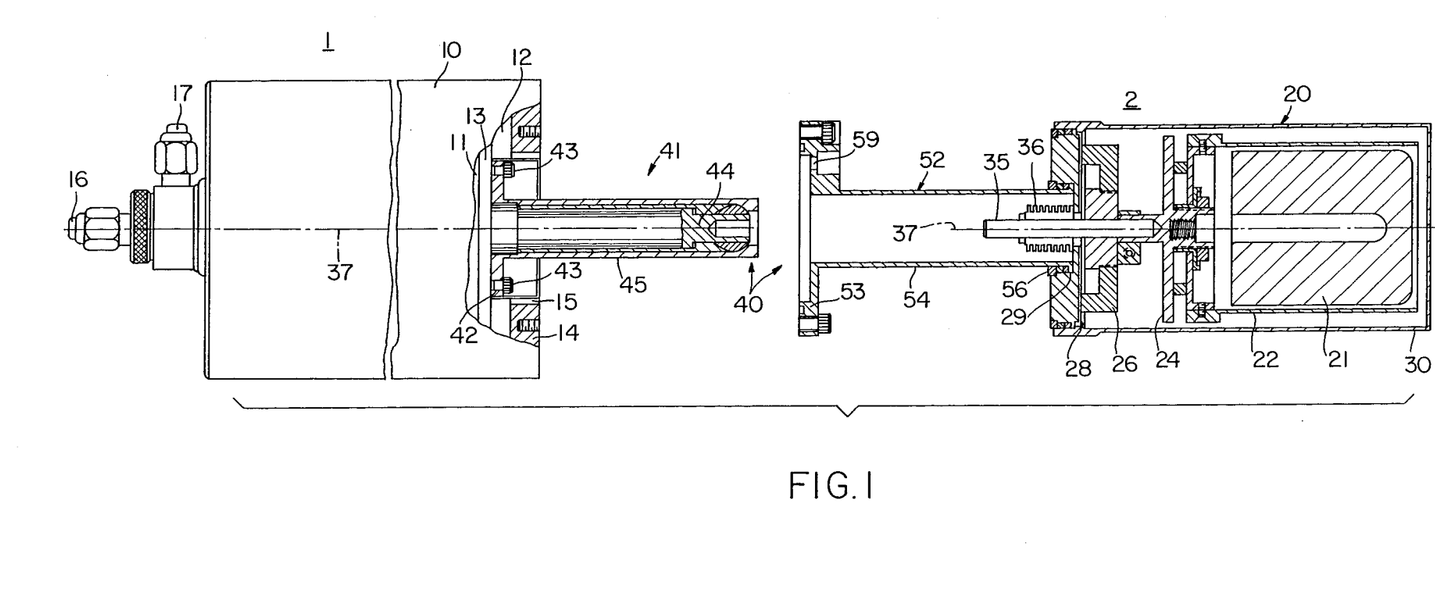
FIGS. 1 through 3 are each an elevation partially in cross-sectional form illustrating a system constructed in accordance with the present invention in various stages of assembly.
Figure 2:
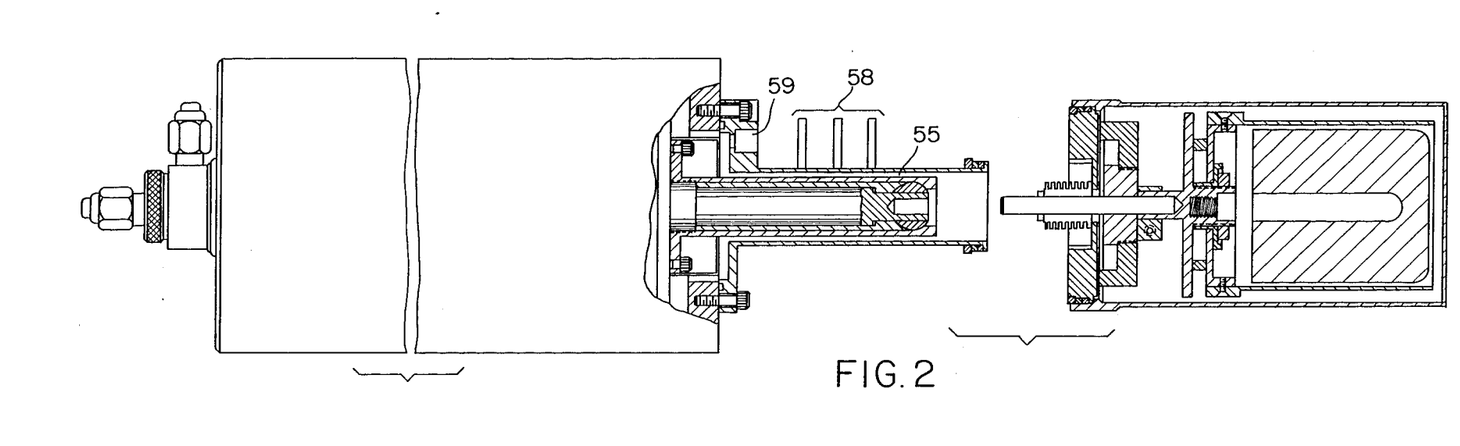
Figure 3:
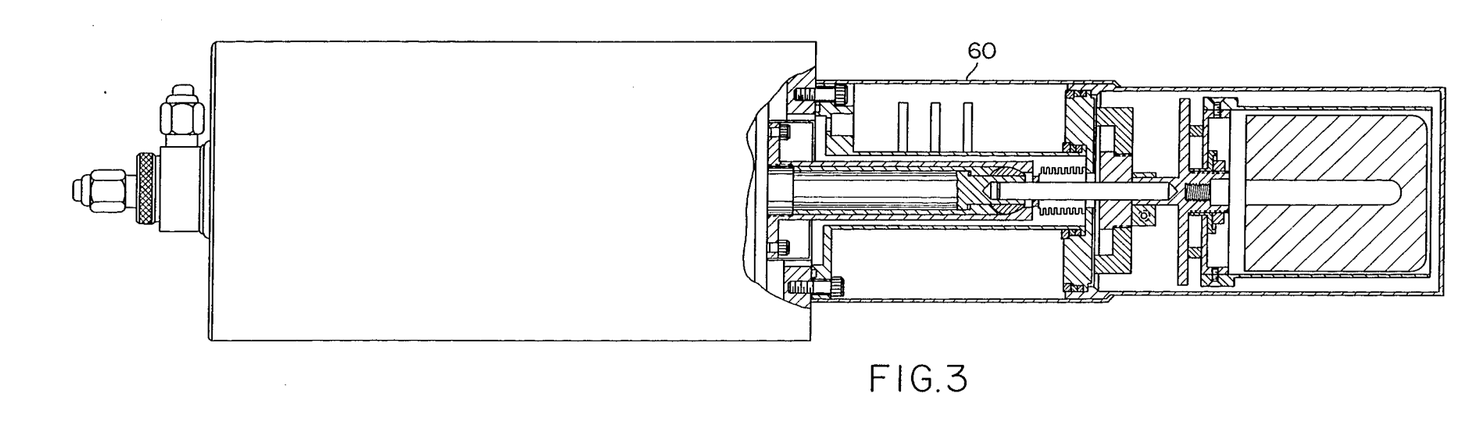

FIGS. 1 through 3 are each elevation views partially in cross section, each illustrating the same components, the same reference numerals being used for the same components in each Figure. In FIGS. 1 and 2, differing forms of sub-assembly are illustrated, and in FIG. 3, the system is shown in an assembled form ready for operation for radiation detection. The system comprises a dewar 1 and cryostat assembly or cryostat 2. The portions of the system utilized for thermally and mechanically connecting the detector to the dewar may be viewed as part of the cryostat assembly 2 rather than the dewar 1, although such characterization is not critical in understanding operation of the present invention.

The dewar 1 comprises a canister 10 enclosing a central chamber 11 for holding cryogenic liquid enclosed by a wall 13, preferably liquid nitrogen. A concentric vacuum jacket 12 surrounds the chamber ii and is disposed between the wall 12 and a dewar outer wall 14 having an opening 15. Ports 16 and 17 are provided each respectively communicating with the chamber 11 and vacuum-jacket 12 in a prior art manner for respectively providing cooling liquid and for coupling to a vacuum pump.

A detector head assembly 20 includes a conventional detector 21 comprising a germanium crystal in an enclosure 22. The detector 21 and enclosure 22 are mounted to a platform 24 supported to support means 26 affixed to a base 28 having an external circular recess 29 and closing a detector head housing 30. The entire detector head housing 30 is evacuated. Thermal conduction means 35 extend from outside the detector head housing 30 through the base 28 to make thermal contact with the platform 24 and germanium detector 21. Preferably, the thermal conduction means 35 comprises a copper rod mounted along an axis 37 common to the detector 21, housing 30 and enclosure 22. A bellows 36 seals around the conduction member 35 adjacent one end thereof outside the detector head assembly 20 and sealably engages the base 28 opening into the interior of the housing 30.

The transition means 40 provides for the transition from the dewar 1 to detector head 20 and provide releasable mechanical and thermal connection therebetween and comprises a cooling rod assembly 41 and cooling rod housing assembly 52. These terms are somewhat arbitrary in nature; the necessary characteristics of these elements are further defined as described below. The cooling rod assembly 41 includes a base portion 42 for mounting to the wall 13 of the cooling fluid chamber 11 and in thermal communication therewith by mounting means such as screws 43. A cooling rod 45 projects axially out of the dewar 1 and includes a radially central receptacle 44 at an axial end thereof for mating with and receiving an end of the conduction rod 35. The receptacle 44 is mounted at an end of the cooling rod 45 in a manner to allow for relative thermal expansion and contraction as further described below. The cooling rod 45 may be constructed of a plurality of metals. A cooling rod housing assembly 52 comprises a base 53 for mounting to the outer wall 14 of the dewar 11 facing the cryostat 2 and covering the opening 15.

Extending axially from the base 53 is a cylindrical housing member 54 for mounting coaxially with the rod 45 and the conduction member 35 and defining a chamber 55 therearound. An extremity of the member 54 remote from the base 53 is dimensioned to be received in the recess 29 and sealed by sealing means 56 in the base 28 of the detector assembly housing 30 so that a vacuum may be maintained. When the base 53 is mounted to the wall 14 of the dewar, 1 the chambers 55 and 12 are in fluid communication and define a common sealed chamber.

Electronics circuit boards 58 carrying prior art circuitry electrically connected to the detector 21 in a prior art manner may be mounted on the radially exterior surface of the member 54. A port 59 may be provided through the base portion 52 to evacuate the volume in which the circuits 58 are placed. As seen in FIG. 3 only, a shroud 60 may be mounted concentrically over the detector head assembly 30 and seal the volume between the base 28 of the detector head assembly 20 and the base 53 of the cooling rod housing assembly 52 means so that the entire assembly as illustrated in FIGS. 1 though 3 is sealed. The receptacle 44 preferably is made out of titanium steel.

Figure 4:
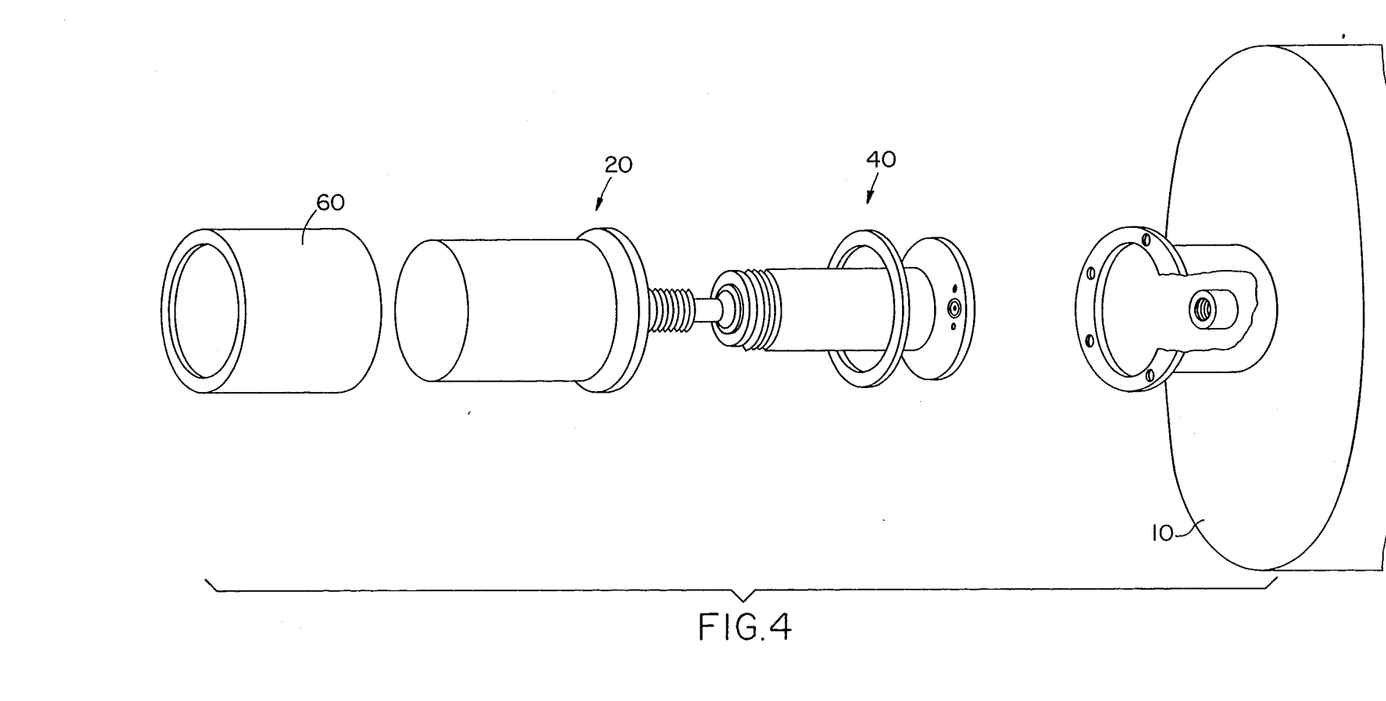
FIG. 4 is an exploded view in axonometric form further illustrating the cooperation of subassemblies in the present invention.

FIG. 4 is an exploded axonometric view further illustrating in one form the subassemblies of FIGS. 1-3.

OPERATION

When the detector is assembled as shown in FIG. 3, it is ready for use. Evacuation through the port 17 is performed with conventional external means (not shown). Cooling liquid is introduced through the port 16 by conventional means and the entire detector assembly begins to cool. Heat is conducted through the cooling rod 45 and conductions means 35 to remove heat from the detector 21. The detector 21 is cooled to approximately 77° K. The conduction rod 35 and receptacle 44 are proportioned such that the change in thermal coefficient of expansion between the two components will result in radial compressive force being applied from the transition member receptacle 44 to clamp the conduction rod 35 providing for a reliable thermal contact and a reliable mechanical connection as well. If it is desired to move the cryostat 2 to a different dewar 1, a prior art operation to raise the temperature of the cryostat is performed. The entire cryostat 2 may be removed. While the dewar vacuum is broken, the electronics package is not disturbed. Alternatively, as illustrated in FIG. 2, the shroud 60 and detector head assembly 30 may be removed while allowing full access to the electronic circuits 58.

Figure 5:
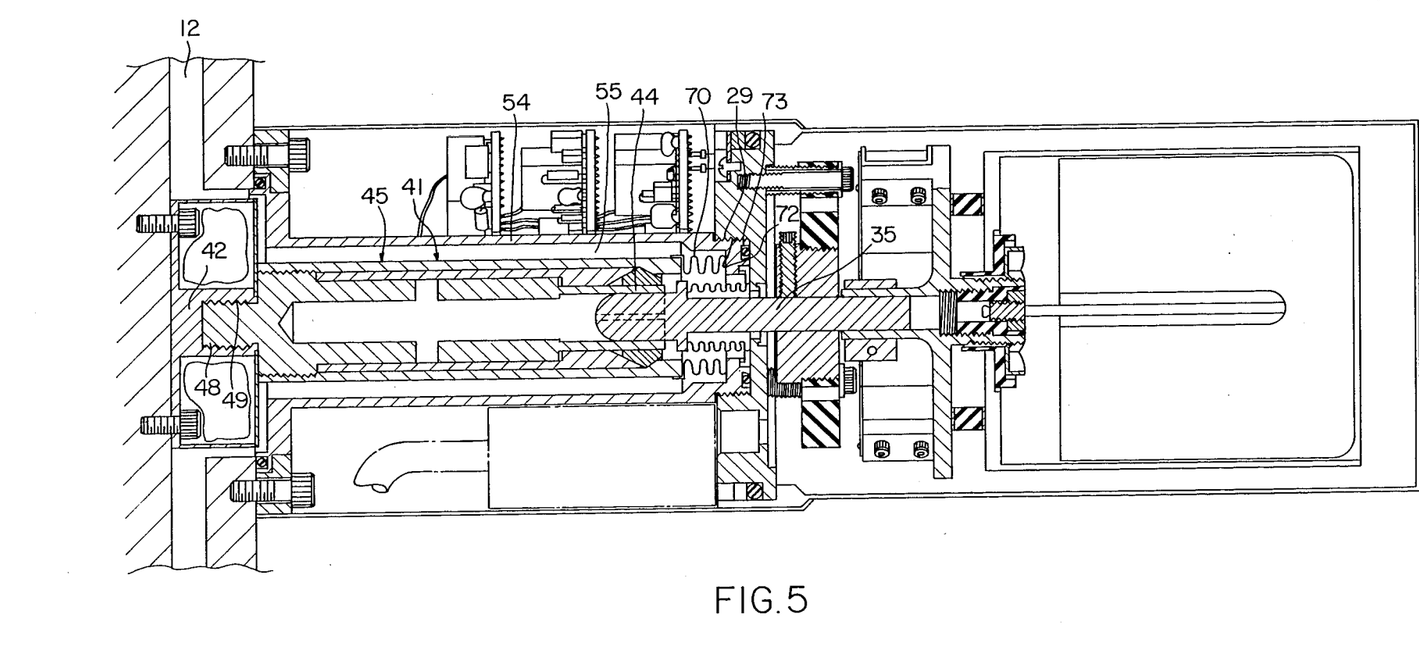
FIGS. 5 and 6 are partial detailed views of a further form of the present invention further illustrating fluid interfaces within an assembled system.
Figure 6:
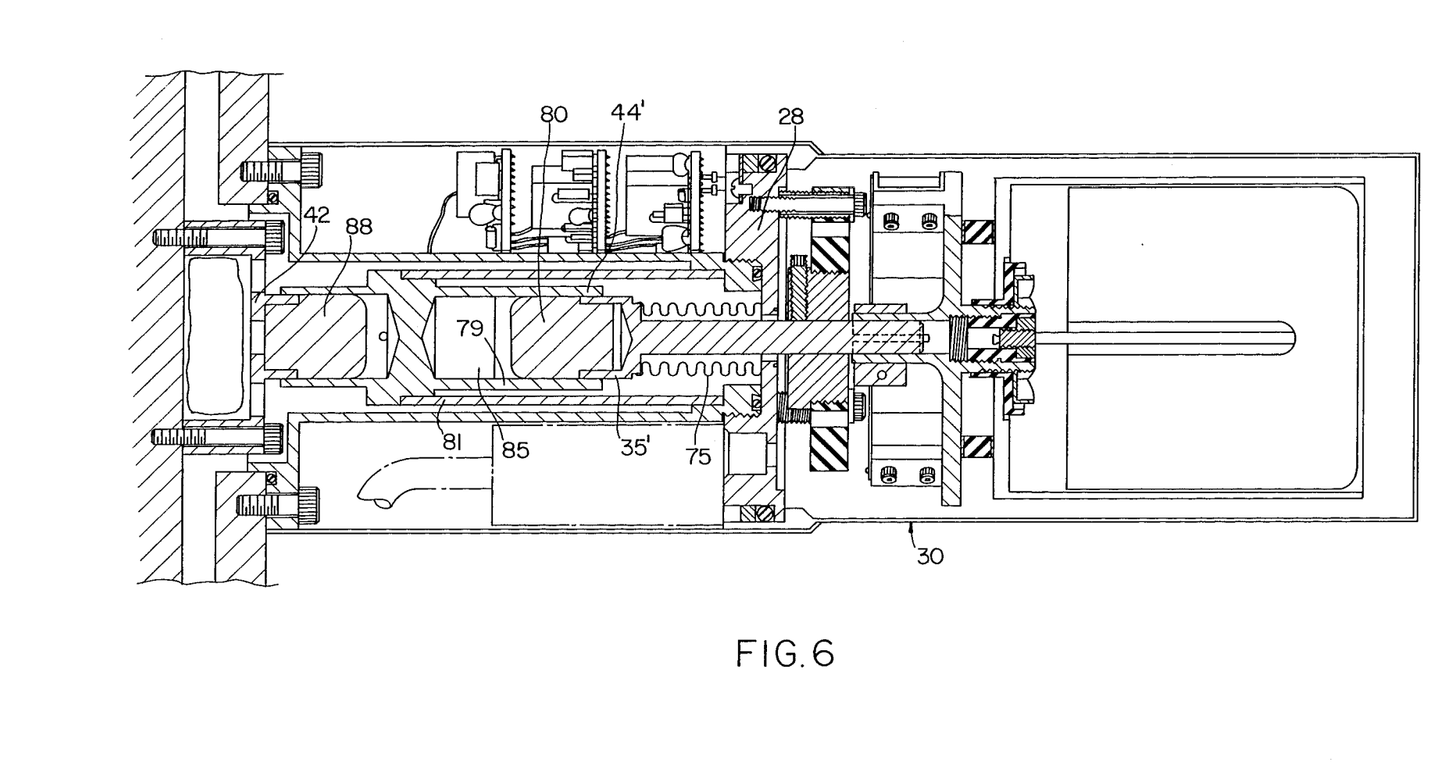

In FIGS. 5 and 6, which are both elevation views in cross-sectional form, further embodiments are illustrated providing the further advantage of the ability to remove the detector head 30 without breaking the vacuum in the dewar 1 and in the transition means 40. Consequently, after an assembly operation, a user may immediately begin the cooling operation. It is not necessary to perform the intermediate step of evacuating the vacuum-jacket 11 and chambers with which it communicates. In FIGS. 5 and 6, the same reference numerals are utilized to denote corresponding components in the detector head assembly 30 and the dewar 1. Primed numbers indicate components varying structure from the embodiment of FIGS. 1-3 but functioning similarly. In the embodiments of FIGS. 5 and 6, the most significant differences are in the area of the receptacle means 44.

The same reference numerals denote components corresponding to those in FIGS. 1-4. The rod 45 is formed with a thread 48 to thread into a thread 49 in the base 42. A transition bellows member 70 is further provided disposed to close the evacuatable chamber 55 even when the detector assembly 20 is detached from the cooling rod housing assembly 52 so long as the housing member 54 is fixed with respect to the cooling rod assembly 41. Since chambers 12 and 55 are kept sealed, a user will be able to cool immediately a newly assembled detector system without first vacuum pumping the chambers 55 and 12 with an external pump. A thread 72 may be provided for the axial end of the housing member 54 to the base 28 of the detector head assembly 20. In this embodiment, the recess 29 in the base 28 comprises a thread 73 for receiving the thread 72.

In the embodiment of FIG. 5, a thermal clamp is provided. The difference of thermal coefficient of expansion between titanium and aluminum parts produces a radially directed force from the receptacle means 44 on the conducting rod 35. Preferably the bellows 70 is thin walled stainless steel. In the embodiment of FIG. 5, in a nominal embodiment, the necessary air interface between the bellows 70 and the bellows 36 may be as small as 0.15 cubic inch.

In the embodiment of FIG. 6, a further form of bellows 75 is provided to close the vacuum path. A cavity 79 in the central portion of the cooling rod 45, is constructed for receiving a double acting cooling rod clamp 80. The double acting cooling rod clamp 80 works in conjunction with a receptacle 44' and a conducting rod 35' each of which have a larger inner diameter than the clamp 80 when the system is at room temperature. The clamp 80 is partially received in an annular end of the conducting rod 35'. The receptacle 44' surrounds an outer diameter of the clamp 80 along a first axial portion and surrounds the annular end of the conducting rod 35' which receives the remainder of the clamp. The clamp member 80 utilizes a steel-nickel alloy having a low thermal coefficient of expansion, an example of which is known by the trademark Invar, in opposition to aluminum or magnesium instead of titanium in opposition to aluminum. The bellows member 75 is a stainless steel bellows. A sieve pack 85 is placed in the remainder of the cavity also receiving the clamp member 80 for use in creating from atmospheric pressure a vacuum therein. Further, a clamp member 88 may be used to similarly releasably engage the cylinder 43 to the base portion 42 of the transition member 41. A glass fiber-epoxy sleeve extends axially from an area near the clamp 88 to the base 28 of the detector head 30 to define an inner wall of the chamber 55.

Figure 7:
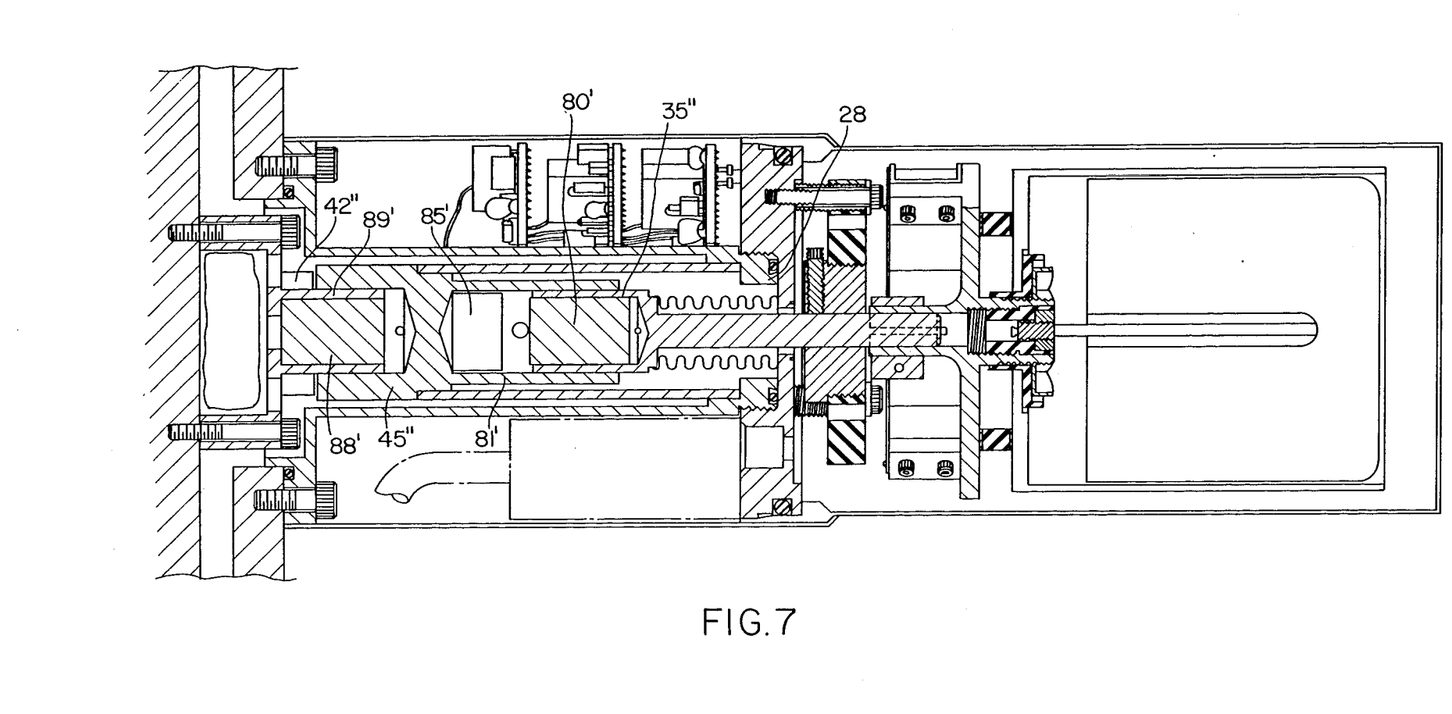
FIG. 7 is a cross-sectional view of a further form of transition member in a cryostat coupled to a partially illustrated dewar.

Referring to FIG. 7, there is illustrated a further form of transition assembly 40 incorporating a further form of cooling rod 45 referred to in FIG. 7 as 45". The cooling rod 45" has a first axial portion adjacent to the dewar 1 for mating with a clamp member 88'. The clamp member 88' is preferably of Invar and surrounded by a copper sleeve 89'. The base 42" is formed to receive a first axial portion of clamp 88' and sleeve 89'. The remainder thereof is received within a recess in the first axial portion of the cooling rod 45". A second axial portion of the cooling rod 45" is of reduced diameter with respect to the first axial portion thereof and is for receiving within a cylindrical recess an end of conducting rod 35" also having a cylindrical recess. A clamp member 80' is received in the cylindrical recess at the end of the conducting rod 35" and is also in axial registration with the second axial end of the cooling rod 45". The remainder of the cylindrical recess contains a charcoal pack 85'. As the system is cooled to operating temperature, the clamp 80" forces the cooling rod 45" into a force fit with the conducting rod 35" and the charcoal pack 85' pumps the recess to vacuum.

In the present embodiment, the fiber glass and epoxy sleeve 81' extending from the first axial portion of the cooling rod 45" to the portion of the sleeve 52" received in the recess 28 is bonded thereto.

The specification has been written with a view toward enabling those skilled in the art to produce photon detector assemblies, cryostats, transition assemblies and subassemblies thereof. Other forms of the cooling rod can be provided consistent with the philosophy of maintaining good mechanical and thermal communication between the dewar and conducting rod and maintaining minimal air volume therearound. A vacuum chamber common to the dewar and transition assembly is provided which in some embodiments need not be vented to the atmosphere to provide for change of detector heads. The detector does not have to be removed from its vacuum enclosure to be changed from one cryostat to another or to be moved from cooperation with one dewar to another.

What is claimed as new and desired to be secured by Letters Patent of the United States is:

1. A cryogenically cooled photon detector system comprising in combination a dewar, a cryostat comprising transition means for sealably engaging the dewar and means for mounting a detector head to said transition means, and a detector head comprising housing means surrounding support means, said housing means being adapted to be evacuated for maintaining a radiation detector, radiation detector means mounted to the support means, said detector head further comprising thermal conduction means thermally connected to said support means and said radiation detector and sealing means and communicating from said detector head through said sealing means for connection to said transition means.

2. The system according to claim 1 wherein said detector head and said transition means are constructed to have dimensions and thermal coefficients of expansion such that said transition means is releasably engagable with said detector head at a first, ambient temperature and radial clamping force is applied between said transition means and said detector head after cooling of said transition means in response to engagement with said dewar.

3. The system of claim 2 wherein said transition member comprises a closed elongated cooling member having an end including a recess for receiving a projection of the thermal conduction means from the detector head and having a second, axially extending longitudinal open end for communicating with said dewar and mounting means for sealably engaging said open end to said dewar, said transition means further comprising a chamber member coaxially mounted with said cooling member having a base portion mounted to communicate with a vacuum jacket of said dewar and having an extended portion for surrounding and extending axially beyond the closed end of said cooling member for mating with the detector head to define a chamber surrounding said cooling member, said chamber being evacuatable.

4. The system according to claim 3 wherein said thermal conduction means is a heat conducting member and said detector head comprises a base portion having said heat conducting member projecting therethrough for engagement with the open end of said transition member, said heat conducting member being mounted to said base means and being surrounded by compression seal means defining a closed member between said base means and said mounting means.

5. The system according to claim 4 further comprising bellows seal means connected between said base portion of said detector unit and the closed end of said elongated cooling member of said transition means.

6. The system according to claim 5 further comprising shroud means surrounding said transition means and enclosing a volume between said detector means and said dewar for defining a closed chamber therebetween.

7. The system according to claim 6 further comprising circuit means for mounting with said shroud means.

8. The system according to claim 3 in which means are further provided in said transition means such that said dewar said transition means and said detector head define three evacuatable chambers, a first chamber comprising said chamber surrounding cooling member, a second chamber comprising space within said recess for receiving a projection of said thermal conduction means, and a third comprising a chamber interior to said chamber member and exterior to said sealing means.

9. A transition member for inclusion in a modular cryogenic detector comprising a first axially extending thermally conductive member having a first member including a first end for cooperative engagement with a dewar, and a second end axially displaced therefrom for engaging a heat conductive member extending from a detector head and a second, elongated husing member for surrounding said first member and defining a vacuum jacket therearound and a comprising means for closing the vacuum jacket between said axial member and said housing member.

10. The transition member of claim 9 wherein said means for closing the vacuum jacket comprise a base at a first axial end of the housing member for mounting in sealing engagement wherein the interior of said housing member is in fluid communication with a vacuum jacket of a dewar.

11. The transition member of claim 10 wherein said housing member has a second axial end axially adjacent said second axial end of said thermally conductive member formed for sealing with a compression seal to a detector head assembly for closing said vacuum jacket.

12. The transition member of claim 10 comprising sealing means having a substantially cylindrical envelope and sealing said second axial end of said thermally conductive member to a axial end of said housing member remote from the dewar for closing said vacuum jacket.

13. The transition member of claim 10 comprising sleeve means sealed to the interior of the second axial end of said housing member and extending to surround the second axial end of the thermally conductive member and to seal with a portion of said thermally conductive member adjacent the first axial end thereof and defining a vacuum jacket between said sleeve means and the interior of said housing member and defining a volume evacuatable by a carbon pack in the interior of said sleeve means.

14. The transition member of claim 10 wherein the exterior of the second axial end of the housing member comprises a thread for securing said transition means to a detector head assembly.

15. The transition member of claim 14 wherein the exterior of said housing member comprises means for mounting electronic circuitry thereto and further comprising shroud means for defining an annular enclosure axially spaced between a dewar and a detector head assembly for enclosing the circuitry.

16. The transition member of claim 10 wherein said first axially extending member comprises a recess and thermal clamping means comprising a central clamp member for receiving an annular end of a heat conductive member and applying radial force thereto upon cooling due to differences in thermal coefficients of expansion of said clamp member, the annular end and said first axially extending member.

17. The transition member of claim 16 further comprising further thermal clamp means for securing a separable portion of said thermally conductive member and a base portion at the first axial portion thereof for affixation to a dewar.

18. The transition member of claim 17 wherein said further thermal clamp means comprises an annular aluminum member in said separable portion receiving an annular projection from said base and low expansion coefficient alloy clamp means radially inwardly thereof in axial registration therewith.

19. The transition member of claim 16 wherein said second axial end of said thermally conductive member comprises annular aluminum member proportioned to receive a copper heat conductive member with low expansion coefficient alloy clamp means radially inward of the annular portions.

20. A detector head in a modular cryogenic detector comprising housing means, mounting means for mounting detector means, said housing means being evacuatable to provide an evacuated chamber, heat conducting means extending from an interior portion of said housing to an exterior portion thereof and having the interior portion thermally connected to the detector, the exterior portion of said heat conducting means being formed for reception in a transition member.

21. A detector head according to claim 20, comprising a base portion from which the conductor extends for mating with housing means of a transition member and said base further comprising thread means for receiving a threaded housing member of a transition member.

* * * * *